United States Patent [19]

Gobin et al.

[11] 4,126,991

[45] Nov. 28, 1978

[54] CUTTER PIN FOR ROTARY MOWER HAVING LENTICULAR SECTION

[75] Inventors: Donald L. Gobin; Joseph E. Scanland, both of Savannah, Ga.

[73] Assignee: Roper Corporation, Kankakee, Ill.

[21] Appl. No.: 820,291

[22] Filed: Aug. 1, 1977

[51] Int. Cl.² .................................................. A01D 55/18
[52] U.S. Cl. ............................................ 56/295; 56/12.7
[58] Field of Search .................. 56/295, 12.7, 255, 256, 56/320.1, 320.2, 50, 400.21, 400.01; 172/15–18; 30/276

[56] References Cited

U.S. PATENT DOCUMENTS

| | | | |
|---|---|---|---|
| 464,852 | 12/1891 | Canuteson | 56/50 |
| 1,780,748 | 11/1930 | Fisher | 56/400.21 X |
| 2,645,892 | 7/1953 | Weems | 56/50 |
| 2,888,993 | 6/1959 | Dunning | 172/15 |
| 3,302,377 | 2/1967 | Ely | 56/295 |
| 3,343,354 | 9/1967 | Freedlander et al. | 56/295 |
| 4,054,992 | 10/1977 | Ballas et al. | 30/276 |
| 4,065,913 | 1/1978 | Fisher et al. | 56/295 |

*Primary Examiner*—Russell R. Kinsey
*Attorney, Agent, or Firm*—Richard L. Voit; C. Frederick Leydig; David J. Richter

[57] ABSTRACT

A cutter pin for mounting on a mower disc having a keyed radial socket with a curved backstop adjacent thereto, the pin being tapered from shank to tip portion in the vertical plane but with the top portion having substantially the same maximum width as the shank in the horizontal plane to provide a flattened blade-like structure with generally parallel lateral edges. The pin is formed integrally of durable plastic having substantially the characteristics of nylon so that it stands out from the periphery in radially self-supporting position with sufficient stiffness for the cutting of grass as the disc rotates. The tip portion has a sufficiently high width-to-thickness ratio and is smoothly merged with the shank so that when the pin strikes a weighty or fixed obstruction with a force having a random vertical component it bends backwardly engaging the backstop with distributed curvature accompanied by resilient twisting of the tip portion about the pin axis so that the engaged cutting edge turns away from the obstruction and so that a relatively flat side of the tip portion is presented for idly wiping-by the obstruction. In the preferred form of the invention the pin is tapered substantially uniformly in the vertical plane from head to tip, with the tip portion being of lenticular cross section. Also in the preferred embodiment the shank is formed with longitudinal ribs of tapering height defining flutes of tapering depth between them.

10 Claims, 21 Drawing Figures

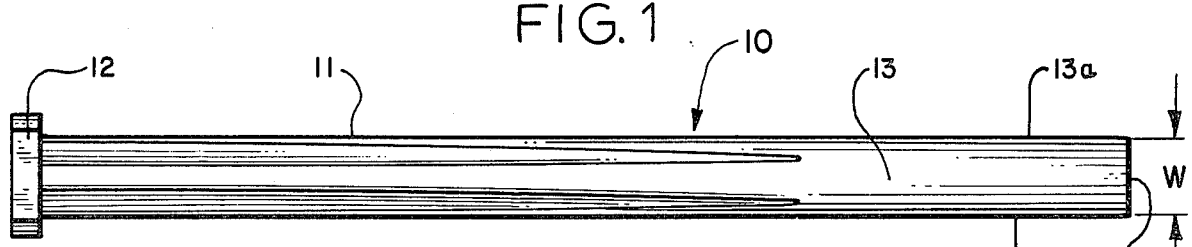
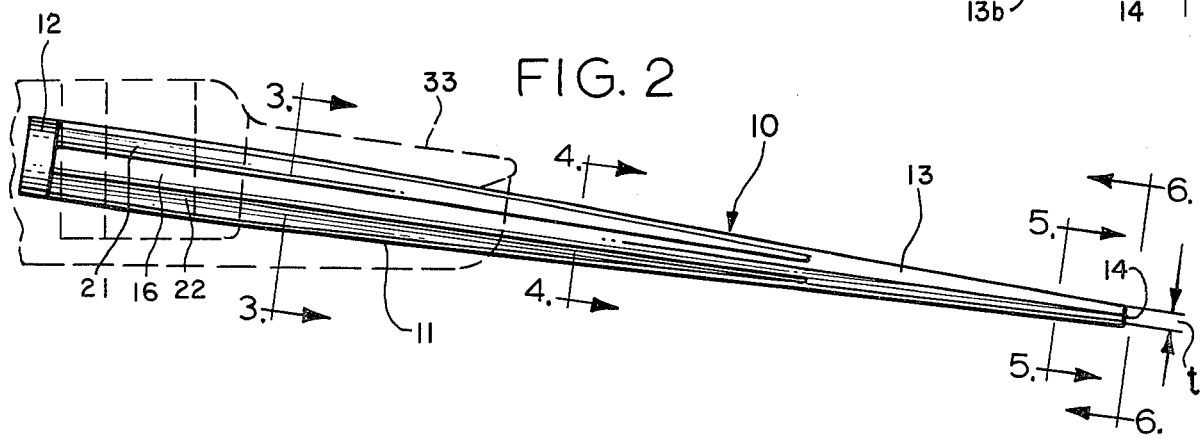
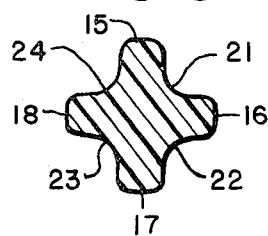 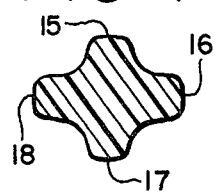 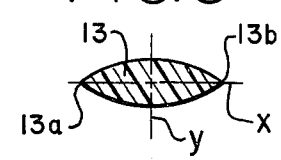 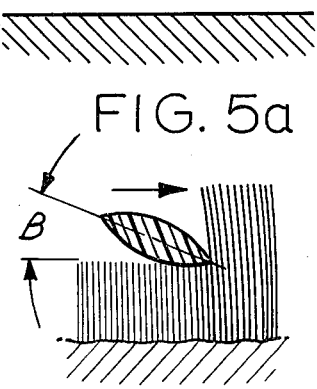
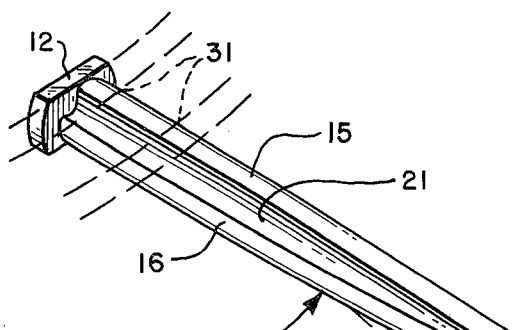 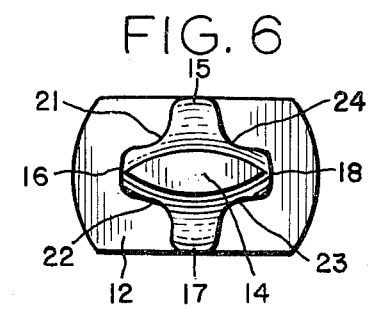

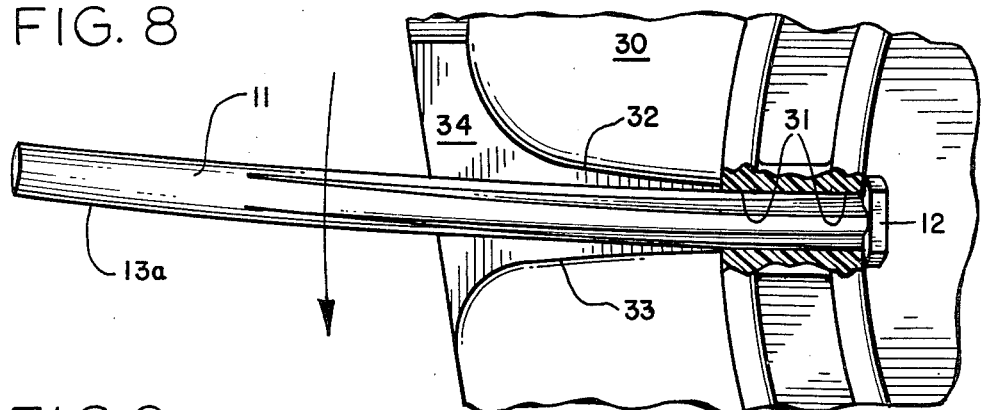
FIG. 8
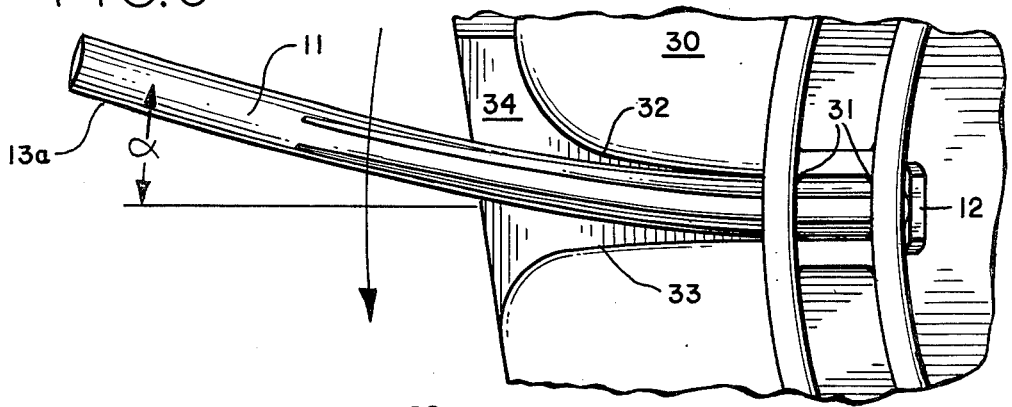
FIG. 9
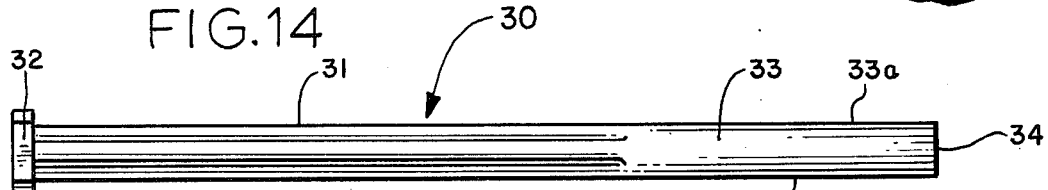
FIG. 14
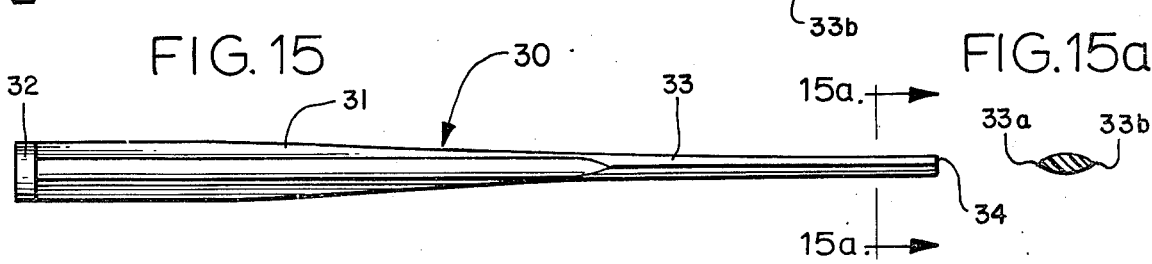
FIG. 15
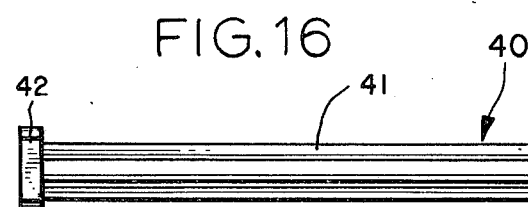
FIG. 15a
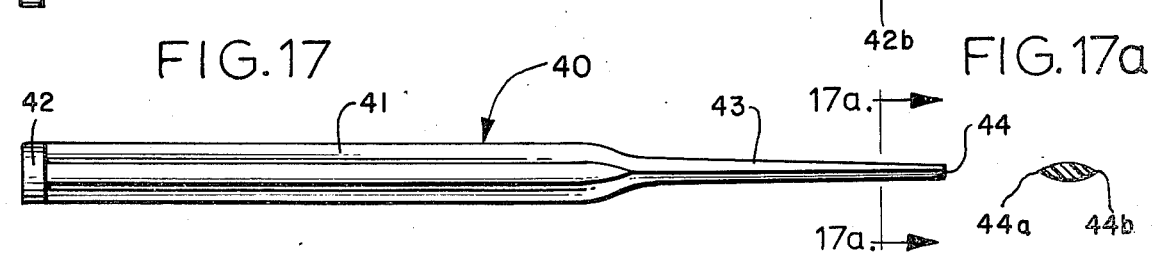
FIG. 16
FIG. 17
FIG. 17a

CUTTER PIN FOR ROTARY MOWER HAVING LENTICULAR SECTION

A U.S. design patent application Ser. No. 741,992 was filed by the present inventors on Nov. 15, 1976 which has matured into Design U.S. Pat. No. D248,557.

In the original form of rotary lawn mower, a steel blade having sharpened edges is rotated at high speed parallel to the ground for cutting of grass, weeds and the like. It has long been recognized that a steel blade with a sharp edge and high inherent inertia constitutes a severe safety hazard, and consideration has been given to reducing this hazard by replacing steel with flexible plastic. Joyner U.S. Pat. No. 3,156,082 which issued in November, 1964, for example, shows substitution of polyethylene or the like. Ely in U.S. Pat. No. 3,302,377 which issued in February of 1967 teaches use of a molded rubber blade reinforced by fibers. Wixson in U.S. Pat. No. 3,303,637 which issued in February of 1967 shows replacement of the arms of a metal blade with loops of resilient wire. Ely in U.S. Pat. No. 3,340,682 which issued in September of 1967 and Freedlander et al. in U.S. Pat. No. 3,389,541 which issued in June of 1968 are further examples of conventionally shaped blades formed of elastomeric material.

Voigt U.S. Pat. No. 3,104,510 which issued in September of 1963 is an example of a blade of conventional rectangular form used with a "whip" and in which a resilient bumper extends along the leading edge the full length of the "whip" for improving efficiency in the cutting of grass or weeds growing adjacent a fixed obstacle. The "whip" is flat-sided with transverse grooves or serrations.

To overcome the disadvantages of a conventional blade, Dagget in U.S. Pat. No. 2,557,598 which issued in June of 1951 discloses use of a disc having a replaceable, radially-projecting wires. Use of radially-projecting wires is also proposed in the Dunlap et al. U.S. Pat. No. 3,208,209 which issued in September of 1965.

In an effort to reduce the hazard presented by a conventional fixed cutter, various inventors have disclosed the use of pivoted flailing elements. Wire flails are proposed in Boggs U.S. Pat. No. 2,538,230 which issued in January of 1971 and in Diesterweg U.S. Pat. No. 3,018,602 which issued in January of 1962, both of these devices being intended for trimming purposes. The use of a disc having sharpened metal blades is shown in Kirk U.S. Pat. No. 3,320,732 which issued in May of 1967, Zweegers U.S. Pat. No. 3,389,539 which issued in June of 1968 and Geier U.S. Pat. No. 3,905,182 which issued in September of 1975.

Frick in U.S. Pat. No. 3,474,608 which issued in October of 1969 shows use of a rotated carrier of "snail" shape having plastic cutting elements 52 mounted along the edge which may be either freely pivoted or crimped in place. The leading edge of the carrier in such construction is capable of striking a hammer blow, and most of the cutting will be done, not by the cutting elements, but by the leading edge of the snail which, extending to a point of maximum radius, is first to engage the standing grass or weeds.

As a separate line of development, inventors became intrigued with the possibilities of cutting grass and weeds using a whirling filament of nylon or the like. An early example of the use of a whirling filament occurs in Naveau French Pat. No. 1,281,450 which issued in December of 1961 and in Reber French Pat. No. 2,044,107 (69.14884) which issued in May of 1969. A similar line of development occurred in Germany as evidenced by Langenstein German Pat. Nos. 6,919,841, 6,919,842 and 6,919,844 which issued in April of 1969, 6,938,165 which issued in September of 1969 and the Vogelenzang German Pat. No. 1,657,039 which issued in October of 1970. The latter patent shows unwinding of filamentary cutters from central spools but does not specify the material of which the filament is made. A more recent German design is the Adlus "UFO" trimmer in which a filament is led outwardly between the opposed rounded surfaces on adjacent buttons on the underside of a rotating disc.

In the U.S., the use of rubber flails impacting vegetation near fence posts or other obstructions is disclosed in Huff et al. U.S. Pat. No. 3,444,674 which issued in May of 1969. Curtis et al. U.S. Pat. No. 3,410,064 which issued in November of 1968 shows a "plant knocker" utilizing strips of tire casing. The use of thin whirling filaments is disclosed in all of the following U.S. patents: Geist U.S. Pat. No. 3,708,967 which issued in January of 1973, Voglesonger U.S. Pat. No. 3,831,278 which issued in August of 1974 and Ballas U.S. Pat. Nos. 3,826,068 and 3,859,776 which issued in July of 1974 and in January of 1975, respectively.

All of the above mower patents are directed toward cutting of grass while attempting to reduce the hazard presented by a sharpened, whirling rectangular steel blade. Sufficient time has now elapsed to be able to form a judgment as to whether the aspirations of the inventors in these and similar patents have been realized. It is apparent that the problem of a weighty blade delivering a solid hammer-like blow has not been avoided in the patents issued to Joyner, Ely, Freedlander and Voigt. The structures in such patents, even though more yielding than a conventional steel blade, are nevertheless fully capable of hammering stones and other debris from the mower at high speeds.

In the Daggett and Dunlap et al. patents which teach the use of a disc with radially extending wires, missile throwing capabilities are reduced, but the wires are subject to concentrated stress, with breakage and bending. The same is true of the devices in the Boggs and Diesterweg patents.

The idea of using a disc with pivotally mounted metal blades or flails as shown in the patents to Kirk, Zweegers and Geier has reduced, but only in minor degree, the hazards inherent in a sharpened steel blade rotated at high speed, while raising the possibility that a blade may become stuck in a rotated, non-cutting position. The structure in the Frick patent is considered to be relatively dangerous and ineffective.

The remaining patents which employ a thin filament, uncoiled from a spool or the like, sacrifice cutting efficiency almost entirely to considerations of safety to the point where the devices are not capable of production cutting of a lawn or other area. The devices rely upon centrifugal force to maintain the cutting elements extended, and since such force is limited, the cutting elements tend to lay back into an ineffective position when cutting all but the lightest vegetation. As a result, cutters of the filamentary type have not been employed, as a practical matter, in full sized rotary mowers, and their use has been limited to light trimming operations. Even where used only for light trimming and edging, a filament is subject to a high degree of wear and almost constant breakage, which explains why such filaments are conventionally supplied in continuous form from a supply spool from which new filament is payed out as required. Sometimes instead of breaking off the ends will "split" or "brush" which further reduces cutting efficiency.

An improvement over the above-mentioned cutters has been the subject of a co-pending application of Scanland et al. Ser. No. 756,329 filed Jan. 3, 1977 entitled Cutter Pin for Rotary Mower. The pin there disclosed is formed of durable plastic with an integral head, shank, and a sharply conical, that is to say pointed, tip portion.

It is an object of the present invention to provide a cutter pin for a rotary lawn mower which has an efficiency of cut more nearly approaching that of a steel blade but which is substantially safer than a steel blade. More specifically it is an object to provide a cutter pin which has a flattened blade-like tip portion having a relatively sharp leading edge which, upon striking an obstruction, undergoes a combined bending and twisting movement so that the flat side of the pin is presented, wiping idly by the obstruction with minimum risk to the engaged object and minimum damage to the pin.

More specifically it is an object of the present invention to provide an improved cutter pin which is tapered from shank to tip portion in its vertical dimension but which has substantially constant width in the horizontal plane, the tip portion being of generally lenticular cross section to present substantially parallel sharp edges and the pin being sufficiently stiff so that it stands out from the periphery of the cutter disc in radially self-supporting position for edgewise engagement of the grass. Thus it is an object to provide a cutter pin for a rotary lawn mower having a blade-like tip portion with a sharp cutting edge which provides a localized cutting force but which turns away from an obstruction so that the obstruction is engaged by the flat side of the tip thereby distributing the force applied by the pin safely over an increased area, reducing the likelihood of serious injury to the operator. It is a related object to provide a pin construction which not only protects an object, such as the foot of the operator, in its path, but which by reason of wiping-by the engaged object has a lesser tendency to turn the object into a flying missile.

It is a related object to provide an improved cutter pin which has both increased sharpness and increased stiffness in the horizontal plane for efficient and positive cutting of a wide variety of grass and weeds while reducing shredding, that is, flagging of the ends at the point of severence.

It is a related object to provide a cutter pin which is aerodynamically more stable than prior pins and which produces a more constant level of cut, thus avoiding the unevenness which has been a characteristic of plastic cutting elements. The combination of reduced flagging and improved evenness of cut results in a lawn having a more neatly trimmed look as well as a lawn which does not "brown out" within a day or two after it is cut.

It is another object of the present invention to provide a cutter pin for a rotary mower which, after striking a fixed obstruction, recovers and restores itself to grass cutting position promptly and completely. It is a more specific object in this connection to provide a cutter pin in which the energy derived from impact is stored in distributed fashion throughout the body of the pin within the elastic limit thereof and thus fully available for prompt restoration of the pin to cutting position. In this connection it is an object to provide a cutter pin which bends and twists in such a fashion that the strain tends to be equalized and which therefore avoids unstable buckling action with its localized stress and strain leading to early failure. It is a related object to provide a cutter pin which has a longer life by virtue of the greater mass of material that is concentrated at the tip where the actual cutting takes place. Consequently, it is an object of the present invention to provide a cutter pin which is not only efficient but which is capable of withstanding the most severe usage.

Finally it is an object of the invention to provide a plastic cutter pin construction which is economical as well as durable and which may be conveniently reversed in position to establish a fresh edge or replaced by the user at a cost of only a few cents whenever the degree of wear makes replacement necessary.

Other objects and advantages of the invention will become apparent upon reading the attached detailed description and upon reference to the drawings in which:

FIG. 2 is an elevational view of the pin of FIG. 1 in its actual cutting position.

FIGS. 3, 4 and 5 are enlarged cross sections taken along correspondingly numbered section lines in FIG. 2.

FIG. 5a shows, in cross section, the tip portion phased in a downwardly canted position.

FIG. 5b shows a modified lenticular cross section.

FIG. 6 is an end view looking along line 6—6 in FIG. 2.

FIG. 7 is a perspective view of the cutter pin showing the progressive twisting which occurs upon engagement of a weighty or fixed obstruction.

FIG. 8 is an underside view of the pin mounted in position in a disc and showing the pin in its stationary radial position.

FIG. 9 is a view showing the pin slightly bent in the act of cutting grass.

FIGS. 10-13 are stop motion views of the cutter pin shown in FIG. 7 showing the bending and twisting of the pin upon engaging a stake or other fixed or weighty obstruction.

FIGS. 14, 15, 15a and 16, 17, 17a are views corresponding to FIGS. 1, 2 and 5 but which show alternative forms of the invention.

Figure 1C:
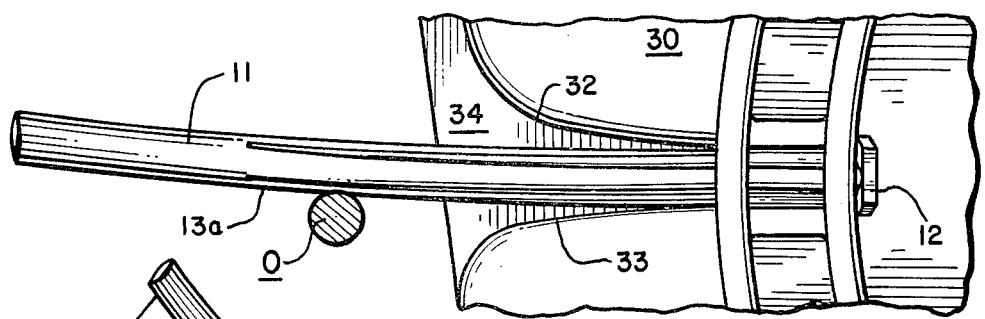
FIG. 1 is a plan view of a cutter pin constructed in accordance with the present invention.

While several embodiments of the invention have been shown, it will be understood that we do not intend to be limited to those particular embodiments but do intend, on the contrary, to cover the various alternative and equivalent constructions included within the spirit and scope of the appended claims.

Turning now to the drawings there is disclosed, in approximately full size, a cutter pin 10 constructed in accordance with the invention having a shank 11 with a head 12 integrally formed at one end and a tip portion 13 having parallel edges 13a, 13b and terminating in a tip 14. The shank of the pin is formed with integral ribs 15–18, preferably four in number to provide a cruciform section, the ribs defining between them longitudinal grooves or flutes 21–24. The ribs are of tapering height, being of maximum dimension adjacent the head and tapering down to zero height at the tip portion, thereby defining complementary flutes of tapering depth. The flutes are of arcuate cross section, that is, arcuately bottomed, to avoid concentration of stress.

In use the pin is mounted in a mower disc which is disclosed in detail in co-pending application Ser. No.

714,982 which was filed Aug. 18, 1976. A portion of the disc is indicated at 30 in FIG. 8. It will suffice to say that the disc includes, on its underside, a radial socket 31 in the form of a pair of radially spaced openings in alignment with one another, with at least one of the openings being keyed to the cruciform section of the shank to prevent rotation of the pin about its axis after it is inserted in position. In addition, or alternatively, a surface is provided on the disc for keyingly engaging a flat side on the head 12 of the pin.

In the path of bending movement of the shank 11 of the pin is a curved backstop 32. The disc may be provided, in addition, with a curved front stop 33 to limit forward movement after rebounding from a fixed or weighty obstacle.

Spanning the stop surfaces 32, 33 is an integral bridge 34 (also shown dot-dash in FIG. 2) which overlies the pin and which holds the pin in a downwardly angled position, as more fully described in the prior application.

In accordance with the preferred form of the present invention, the pin is tapered substantially uniformly over the shank and tip portion in a vertical plane, but the tip portion has substantially the same maximum width as the shank in the horizontal plane to provide a flattened blade-like tip with generally parallel cutting edges, the tip having a sufficiently high width-to-thickness ratio, and smoothly merged with the shank, so that when the pin strikes a weighty or fixed obstruction it bends backwardly, engaging the backstop with distributed curvature accompanied by resilient twisting of the tip portion about its axis, with the result that the engaged cutting edge turns away from the obstruction and so that a relatively flat side of the tip portion is presented for wiping idly by the obstruction.

Thus it will be noted in FIG. 2 that the taper is shallow and substantially uniform, with the tip having a thickness $t$ and with the entire tip portion having an average thickness which does not substantially exceed $t$. FIG. 1 shows, in plan view, that the width $w$ in the horizontal plane, is substantially constant, the tip 14, and the adjacent tip portion, having a width $w$ which is substantially equal to the maximum width dimension of the shank 11. The ratio of width-to-thickness is preferably on the order of 3 to 1. This results in a bending moment of inertia about a horizontal neutral "$x$" axis (FIG. 5) which is substantially less than the bending moment of inertia about a neutral "$y$" axis at 90° thereto. This, plus the smooth tapered transition between the tip portion 13 and the shank 11 results in a tendency of the pin to twist about its axis, with avoidance of localized strain or buckling, as it bends backwardly in the face of a fixed or weighty obstruction.

It will be helpful, first of all, to consider the condition of normal cutting followed by an observation of the twisting sequence which occurs upon striking a fixed or weighty obstruction with an analysis of such twisting movement.

Thus it is found that during normal cutting the tip portion 13 retains its horizontal orientation, presenting a relatively sharp cutting edge to the grass similar to the edge presented by a metal blade, while yielding slightly in response to the reaction torque. The angle $\alpha$ of backward bend ranges from approximately 5° in the case of light grass to about 10° (FIG. 9) in the case of heavier grass or weeds. A disc having a diameter of approximately 14 inches and rotated at 3200 rpm. is assumed.

In the normal cutting of grass or other vegetation the present pin is found to have a number of important and even unforeseen features and advantages. In the first place, because of the sharpened cutting edge a more localized blow is applied to each blade of grass, thereby reducing the flagging or shredding which tends to make a lawn take on a brownish hue within a day or two after it is cut. The efficiency of cutting, and the energy which may be imparted to the grass at point of cut, is dependent upon mass multiplied by the square of the velocity. Keeping the velocity to a safe level corresponding to a rotative speed on the order of 3200 rpm., the mass of the tip portion of the pin, where the actual cutting takes place, is substantially greater than where the tip portion is tapered out to a point. Since cutting occurs largely by impact, the tip portion may be likened to a hammer. By using a flattened blade-like cross section the amount of material in, and hence the mass of, the hammer head is increased substantially over that of a pointed pin.

It is one of the features of the present pin that the tip portion is of lenticular cross section as illustrated in FIG. 5, presenting two relatively sharpened edges 13a, 13b facing in opposite directions. Such shape is found to be aerodynamically more stable and efficient, compared to earlier structures, with the shape and reduced front area combining to minimize air turbulence and any tendency toward fluttering. Moreover, by reason of the rounded undersurface of the pin, the pin being mounted in a shallow downwardly extending position as shown in FIG. 2, drag upon the cut grass is reduced. The net result is a reduction in the vertical deflection of the pin tip, greater evenness of cut over a wide range of grass conditions, and lower power requirement. Drag may be still further reduced by orienting the pin in the disc, that is, phasing the keyed connection at socket 31, so that the tip portion occupies an initial position in which it is downwardly canted at a slight angle $\beta$, which may be on the order of 20°, as shown in FIG. 5a. Studies show that the cutting advantages can be obtained using a tip portion of generally lenticular cross section having a width-to-thickness ratio substantially within the range of 1.50 to 4.50, with an average value on the order of 3.0 being preferred.

One of the primary advantages, however, of employing a pin having a tip portion of flat blade-like configuration integral, and smoothly merged with, a fixed shank of greater cross sectional area, is the fact that the pin, upon striking a fixed or weighty obstruction tends to twist progressively about its axis as set forth in FIG. 7 and the stop motion views FIGS. 10–13, inclusive, giving rise to a number of advantages.

In FIG. 10 the pin is seen striking an obstruction O which may, for example, be in the form of a steel stake driven into the ground. The stake is engaged by the leading edge 13a which, in the initial portion of the encounter, occurs with the tip of the blade generally horizontal. However, it is found that in practice the impact will have a random upward or downward component causing a slight initial twisting of the blade as indicated in the "FIG. 10" position in FIG. 7 where a slight clockwise twisting may be noted.

Figure 11:
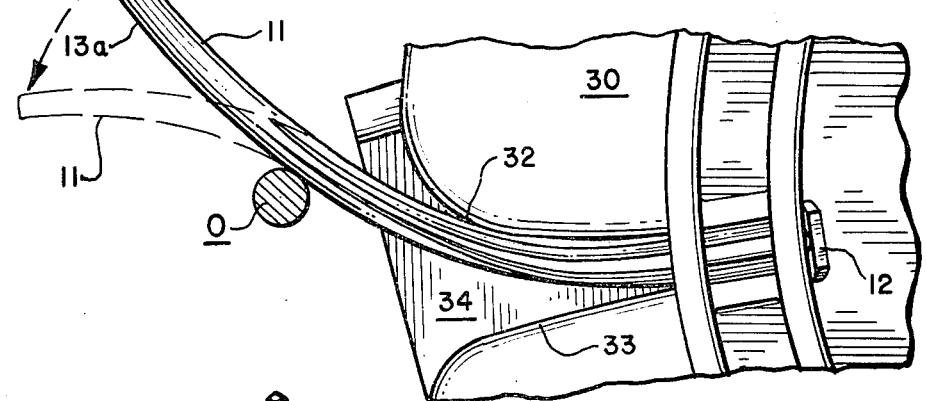
Figure 12:
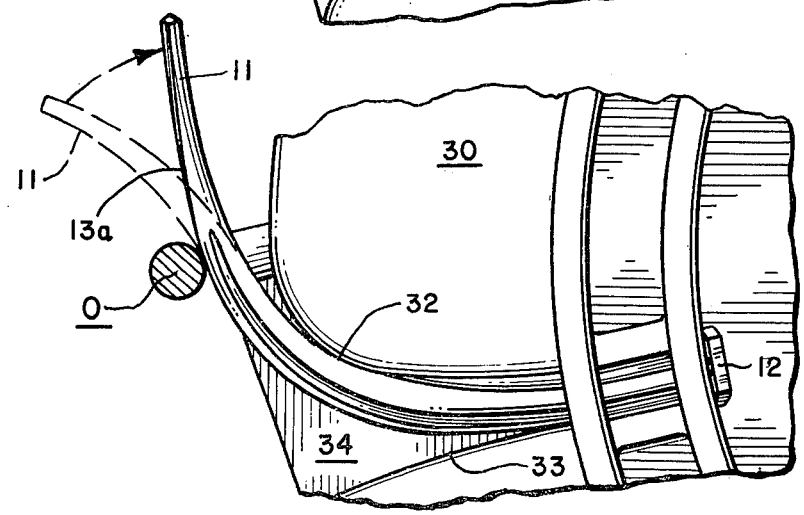
Figure 13:
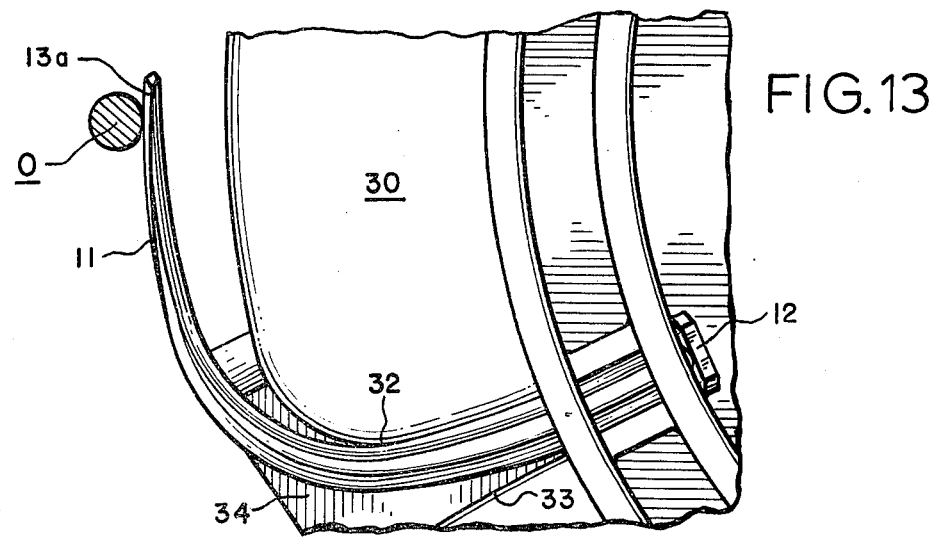

A moment thereafter, by reason of the combined rotation and forward movement of the disc, the obstruction O is additionally engaged as shown in FIG. 11 accompanied by progressive twisting as illustrated in FIG. 7. The pin has a tendency to embrace or "wrap around" the obstruction as indicated by the dot-dash outline in FIG. 11, particularly where the obstruction is rigid, concentrated and engages well inwardly from the tip of the pin. Upon still further rotation of the disc the pin is bent about its backstop surface approaching a 90° position as illustrated in FIG. 12, with a swinging back of the pin from its dot-dash position. By the time the obstruction is opposite the tip portion of the pin the twisting effect is a maximum. While the twisting of the tip portion may not reach a full 90°, it is apparent in FIG. 7 that the cutting edge is sufficiently turned from its normal plane so that a relatively flat side of the tip portion wipes by the obstruction.

The twisting phenomenon may be explained by the substantial difference between the bending moment of inertia about the horizontal neutral axis $x$ and the vertical neutral axis $y$, the moment of inertia being substantially greater about the $y$ axis so that the tip portion strongly resists bending in its own plane. Moreover, it can be shown that the initial impact is almost never purely horizontal but usually has a random vertical component. Consequently, as the pin is brought increasingly into engagement with a fixed obstruction, the resultant force does not act through the longitudinal axis of the pin but produces a torque about the axis tending to twist the tip into a plane more favorable to bending movement. One advantage of the downward canting illustrated in FIG. 5a is that the pin is predisposed to twist in a certain direction. In any event, once the process is set in motion, twisting will tend to continue to occur as the tip portion of the pin "seeks" to bend about its "weaker" $x$ axis. Such progressive twisting of the pin tip about the pin axis, occurring smoothly and progressively in the present construction, is to be contrasted with the unstable collapse or buckling which has been characteristic of some prior constructions.

One result of the progression illustrated in FIG. 7 is that the restoring force of the pin, being bent into the full 90° position, is substantially less than the force which would exist if the tip portion of the pin retained its horizontal orientation through the full course of the bend. In short the twisting acts as a safety valve enabling the tip portion of the pin to undergo radical bending without setting up destructive stresses, particularly the edge portions of the pin at maximum spacing from the pin axis. Localized stresses, of the type accompanying uncontrolled buckling, are avoided. This contributes substantially to the life of the pin. As a related benefit, it is found that the strain of the pin is kept substantially within the elastic limit. Thus the energy which is stored in the pin as a result of superimposed bending and twisting movement is stored throughout the body of the pin and is available for restoration of the pin to its initial state, so that the pin tends to restore itself more promptly and more completely to cutting position after the obstruction has been safely traversed. Indeed, tests show that substantially complete restoration occurs in less than 0.02 second. Because of this and the self-protection of the cutting edge, the encountering of an obstruction has negligible effect upon cutting efficiency. Since the restoring force, and hence and energy stored in bending of the pin, is reduced, the pin is less likely to turn any loose obstruction into a high speed missile.

While the invention has been described with the tip of the pin oriented horizontally as illustrated in FIG. 5, the same analysis applies where the tip of the pin is canted downwardly (FIG. 5a) with the additional advantage that the pin is predisposed to twist in a predictable direction:

The preferred material for the pin is nylon, specifically the nylon identified by duPont as No. 801 Zytel having a tensile strength of 6000 pounds per square inch (as measured by ASTM Test D-638), a notched Izod impact strength of 15-25 foot pounds per inch (ASTM Test D-256) and a flexural modulus of 125,000 pounds per square inch (ASTM Test D-790). Other materials having substantially the same physical characteristics as nylon may be substituted provided they have a tensile strength between, say, 5,000 and 15,000 pounds per square inch, an Izod impact strength greater than 2 foot pounds per inch, and a flexural modulus between 100,000 and 200,000 pounds per square inch.

With regard to the possible variations in size, the pin has a preferred length on the order of 6 inches but may vary between about 4 to about 7 inches without sacrificing the advantages of the invention. The projecting length is preferably about 3 inches but may vary between 2 and 5 inches. The width of the blade, and the maximum shank diameter, is preferably $\frac{3}{8}$ inch but may range between $\frac{1}{4}$ and $\frac{1}{2}$ inch, with the width of the tip portion, if desired, being somewhat less than the shank diameter, especially in the larger sizes. The shank may be of cruciform section, as illustrated, which provides good utilization of material and convenient keying, or of any other cross sectional shape, including round. The thickness at the very tip should preferably lie within the range of 0.15 to 0.05 inch.

The bending modulus, defined as the product of the modulus of elasticity and the area moment of inertia, taken about the neutral $y$ axis should preferably lie within the range of 15 to 90 inch$^2$-pound.

The pin may be further optimized with respect to its initial deflection modulus that is, with respect to the amount which the pin bends on being subjected to a relatively light force at the tip, the force being applied in a direction which is normal to the base portion of the shank. For measurement of deflection modulus a pin is clamped in horizontal position to form a cantilever having five inches of exposed length. A weight of 0.2 pound is applied to the tip and the tip deflection is measured in inches. Dividing the observed deflection by the applied load, a modulus is obtained in units of inches per pound. With the tip portion oriented vertically "edgewise" a deflection modulus is obtained which should, desirably, range between 0.9 and 1.5 inches per pound. With the tip portion initially horizontal the deflection modulus should preferably range between 1.2 and 1.8 inches per pound.

In order to understand the behavior of the disclosed pin under actual cutting conditions, a transparent viewing port was formed in a mower deck and movies were taken through the port at a speed of 4,000 frames per second, the engine speed being set at 3200 rpm. Normal grass cutting was observed in light and heavy grass, and it was noted that the tip portion of the pin bent back a maximum of approximately ten degrees, as previously stated, without departing from the horizontal cutting plane. It was found that when an object such as a tennis shoe or soft drink bottle was fed under the deck the pin simply bent and brushed or "wiped-by" the object imparting very little momentum to it. In one typical case the pin hit the object a total of 50 times before it was finally ejected out of the discharge chute, the ejection being at a safely low velocity, with prompt recovery and no perceptible damage to the pin.

The most extreme pin behavior was found when the pin encountered a metal stake fixed in the ground, as earlier described in connection with FIGS. 10-13, but even a metal stake was repeatedly traversed, safely and without killing the engine.

While it is preferred, as discussed above, to make the tip portion 13 of the pin of lenticular cross section as shown in FIGS. 5 and 5a, it will be understood that in order to practice the invention the upper and lower surfaces of the tip portion need not be smoothly curved and may, if desired, be provided with two or more longitudinal facets. For example, the upper and lower surfaces may each consist of two facets 13' arranged at an angle as shown in FIG. 5b, producing a diamond-shaped profile which rather closely conforms to the initially described curved profile as indicated by the dot-dashed lines. In both cases the profile is such as to produce sharpened lateral edges. Thus the term "lenticular" as used herein shall be considered to be generic to both curved and faceted versions such as illustrated in FIGS. 5 and 5b.

In accordance with one of the detailed features of the present invention the tip portion 13 of the pin is sharpened along both lateral edges 13a, 13b and the keyed connection provides for insertion of the pin into the socket in rotated positions separated by 180° so that when one sharpened edge becomes dull the pin may be rotated about its axis into reversed orientation to bring the other sharpened edge into active cutting position. The two 180° positions are readily obtained by making the socket of matching and symmetrical cruciform profile or by making use, alternatively, of the two flat sides of the head 12 for keying purposes. While the leading edge can be expected to lose its sharpness as a result of continued usage and striking of obstructions, it has been found, rather surprisingly, that continued usage, and resulting wear, has a sharpening effect upon the trailing edge of the pin. As a result of this self-sharpening action the dull side, when in trailing position, may actually regain its sharpness so that it may be restored to active cutting position, thereby enabling the pin to go through a number of cycles of reversal and before replacement becomes necessary.

While it is preferred to employ a pin which is substantially uniformly tapered, in the vertical direction, over its shank and tip portion as illustrated in FIGS. 1 and 2, this particular shape is not essential to the practice of the present invention and it is found that the invention may be practiced using a pin which is tapered over the shank but which is non-tapered in the region adjacent the tip. Thus referring to FIGS. 14 and 15 a pin 30 is shown having a shank 31 which is tapered in vertical profile (FIG. 15) which has a head 32 and a tip portion 33 terminating in a tip 34. The tip portion 33 is, in this embodiment as illustrated, parallel sided, top and bottom. Since the top portion emerges smoothly with the shank, bodily twisting of the pin upon striking an obstruction can be expected to occur just as described in connection with FIG. 7, without buckling or destructive concentration of stress. If, using a particular material buckling is experienced at the junction between the tip portion 33 and shank 31, the tip portion may, correctively, be provided with some taper in the vertical plane, resulting in a construction which is a hybrid, or compromise, between that which is illustrated in FIG. 2 and that which is shown in FIG. 15.

Also while it is preferred to taper the shank to insure distributed backward bending in the face of an obstruction, in accordance with the above-described embodiments, the taper in the shank is not to be considered an essential of the present invention and the shank may, if desired, be parallel sided. Thus, referring to FIGS. 16 and 17 a pin 40 is illustrated having a parallel sided shank 41 with a head 42 and merging into a tip portion 43 having sharpened edges 43a, 43b terminating in a tip 44. The portion 43, as illustrated in FIG. 17, may be either parallel sided or slightly tapered, as shown. The taper is desirable in order to defeat any tendency toward buckling and concentration of stress at the region of merger of the tip portion and shank as discussed in connection with FIG. 15. While the shank 41 is parallel sided as viewed in horizontal profile on (FIG. 16), the backstop 32 (FIGS. 8-13) tends to insure bending of the pin with length-tributed curvature.

The term "head" denotes the retaining means at the inner end of the pin whether enlarged or not. The term "substantially uniformly" as applied to the taper in the vertical plane denotes a gradual although not necessarily linear taper. The term "keyed" as applied to the radial socket 31 includes any socket having provision for locking a pin against rotation about its own axis. The term "smoothly merged", referring to the region between the tip portion and the shank means that the change in cross section at the transition is sufficiently gradual so that localized buckling at the transition, with resulting concentration of stress, is avoided. In describing the cutting edge as "turning away" from an obstruction, reference is intended to canting or twisting of the plane of the cutting edge, keeping in mind that the edge does not actually break contact with the obstruction. While the pin constituting the present invention has been described in connection with its preferred use on a mounting member in the form of a circular disc, it will be apparent that the mounting member may, between the sockets, depart from a circular profile, and the term "disc" shall accordingly be considered to refer, as well, to rotating mounts of non-circular shape.

What is claimed is:

1. A cutter pin for use with a rotary mower employing a mower disc having a keyed radial socket inwardly of the periphery thereof compromising, in combination, a head, a shank, and a tip portion so dimensioned that when the shank is secured in the socket adjacent the head the tip portion extends beyond the periphery, the tip portion being only a fraction of the thickness of the shank in the vertical plane and having approximately the same width as the shank in the horizontal plane with the result that the tip portion is flattened and blade-like with generally parallel lateral edges, the pin being formed integrally of durable plastic having substantially the characteristics of nylon so that it stands out from the periphery in radially self-supporting position with sufficient stiffness for the cutting of grass as the disc rotates, the tip portion being of lenticular cross section having sharpened edges facing in opposite directions, the tip portion having a sufficiently high width-to-thickness ratio and being smoothly merged with the shank so that when the pin strikes a weighty or fixed obstruction resulting in an impact force having a random vertical component it bends backwardly with distributed curvature accompanied by resilient twisting of the tip portion about the pin axis so that the engaged cutting edge thereof turns away and so that a relatively flat side of the tip portion is presented for idly wiping-by the obstruction.

2. A cutter pin for use with a rotary mower employing a mower disc having a keyed radial socket inwardly of the periphery thereof comprising, in combination, a head, a shank, and a tip portion so dimensioned that when the shank is secured in the socket adjacent the head the tip portion extends beyond the periphery, the tip portion being only a fraction of the thickness of the shank in the vertical plane and having approximately the same width as the shank in the horizontal plane with the result that the tip portion is flattened and blade-like with generally parallel lateral edges, at least the leading one of the edges being sharpened, the pin being formed integrally of durable plastic having substantially the characteristics of nylon so that it stands out from the periphery in radially self-supporting position with sufficient stiffness for the cutting of grass as the disc rotates, the tip portion having a sufficiently high width-to-thickness ratio and being smoothly merged with the shank so that when the pin strikes a weighty or fixed obstruction resulting in an impact force having a random vertical component it bends backwardly with distributed curvature accompanied by resilient twisting of the tip portion about the pin axis so that the engaged cutting edge thereof turns away and so that a relatively flat side of the tip portion is presented for idly wiping-by the obstruction.

3. The combination as claimed in claim 2 in which the tip portion has a width-to-thickness ratio substantially within the range of 1.5 to 4.5.

4. The combination as claimed in claim 2 in which the shank is formed with integral ribs extending longitudinally along the shank and of tapering height so as to define flutes of tapering depth between them.

5. The combination as claimed in claim 2 in which the shank has a total of four equally spaced ribs and in which the flutes have bottoms of arcuate cross section.

6. A cutter pin for use with a rotary mower employing a mower disc having a keyed radial socket inwardly of the periphery thereof comprising, in combination, a head, a shank, and a tip portion so dimensioned that when the shank is secured in the socket adjacent the head the tip portion extends beyond the periphery, the pin being tapered down substantially uniformly over the shank and tip portion in the vertical plane so that the tip is thin as compared to the shank having only a fraction of the thickness of the latter, but with the tip portion having substantially the same maximum width as the shank in the horizontal plane with the result that the tip portion is flattened and blade-like with generally parallel lateral edges, at least the leading one of the lateral edges being sharpened, the pin being formed integrally of durable plastic having substantially the characteristics of nylon so that it stands out from the periphery in radially self-supporting position with sufficient stiffness for the cutting of grass as the disc rotates, the tip portion having a sufficiently high average width-to-thickness ratio and being smoothly merged with the shank so that when the pin strikes a weighty or fixed obstruction resulting in an impact force having a random vertical component it bends backwardly with distributed curvature accompanied by resilient twisting of the tip portion about the pin axis so that the engaged cutting edge thereof turns away and so that a relatively flat side of the tip is presented for idly wiping-by the obstruction.

7. A cutter assembly for use with a rotary mower including a mower disc having a keyed radial socket spaced inwardly of the periphery with a curved backstop between the socket and the periphery, a cutter pin having a keyed connection with the socket and having a head, a shank, and a tip portion so dimensioned that when the shank is secured in the socket adjacent the head the shank is opposite the backstop with the tip portion extending beyond the periphery, the pin being tapered down substantially uniformly over the shank and tip portion in the vertical plane so that the tip is thin as compared to the shank having only a fraction of the thickness of the latter, but with the tip portion having substantially the same maximum width as the shank in the horizontal plane with the result that the tip portion is flattened and blade-like with generally parallel lateral edges, at least the leading one of the lateral edges being sharpened, the pin being formed integrally of durable plastic having substantially the characteristics of nylon so that it stands out from the periphery in radially self-supporting position with sufficient stiffness for the cutting of grass as the disc rotates, the tip portion having a sufficiently high average width-to-thickness ratio and being smoothly merged with the shank so that when the pin strikes a weighty or fixed obstruction resulting in an impact force having a random vertical component, it bends backwardly engaging the backstop with distributed curvature accompanied by resilient twisting of the tip portion about the pin axis so that the engaged cutting edge thereof turns away and so that a relatively flat side of the tip portion is presented for idly wiping-by the obstruction.

8. The combination as claimed in claim 7 in which the keyed connection is so phased that the sharpened leading edge is canted downwardly so that such edge is in lowermost position to further reduce the drag on the cut grass and to predispose the pin to a downward direction of twist upon striking of an obstruction.

9. The combination as claimed in claim 7 in which the tip portion is sharpened along both lateral edges and in which the keyed connection provides for insertion of the pin into the socket in rotated positions separated by 180° so that when one sharpened edge becomes dull the pin may be rotated about its axis into reversed orientation to bring the other sharpened edge into active cutting position.

10. As an article of manufacture for use in the cutter disc of a rotary lawn mower having a radial socket spaced inwardly from the periphery, a cutter pin comprising, in combination, a shank having relative thickness in both transaxial directions, the shank terminating at its outer end in a relatively thin but stiffly resilient tip portion for extending outwardly from the periphery of the disc to provide a cutting edge, the shank having a head at its inner end for retaining the pin in the radial socket, the cutter pin being formed integrally of durable plastic having substantially the characteristics of nylon so that it stands out from the periphery in radially self-supporting position with sufficient stiffness for the cutting of grass without reliance upon centrifugal force as the disc rotates, the pin being of tapered construction to define a flattened blade-like tip portion of rectangular profile having a width substantially equal to the shank dimension in the corresponding direction and a thickness which is a fraction of that of the shank dimension, the tip portion being smoothly merged with the shank so that upon striking a fixed or weighty obstruction the pin yields by bending backwardly with smoothly distributed curvature.

* * * * *